J. BEAUDRY.
Lathes for Turning Wood.

No. 147,092. Patented Feb. 3, 1874.

Witnesses.

J. Beaudry
Inventor
by his attorney
Henry Grist

UNITED STATES PATENT OFFICE.

JOSEPH BEAUDRY, OF OTTAWA, CANADA.

IMPROVEMENT IN LATHES FOR TURNING WOOD.

Specification forming part of Letters Patent No. 147,092, dated February 3, 1874; application filed July 15, 1873.

*To all whom it may concern:*

Be it known that I, JOSEPH BEAUDRY, of the city of Ottawa, in the county of Carleton, in the Province of Ontario and Dominion of Canada, have invented a certain Improvement in Lathes for Turning Wood, of which the following is a specification:

The invention has for its object the cutting or turning in a lathe of polygonal sides; and it consists in a removable cylinder applied to the main shaft to form a bearing for the work, and prevent it from bending; and, further, in the combination of said cylinder and a pair of adjustable flanges with the main shaft and a series of rotary cutters, all as hereinafter particularly described.

Figure 1:
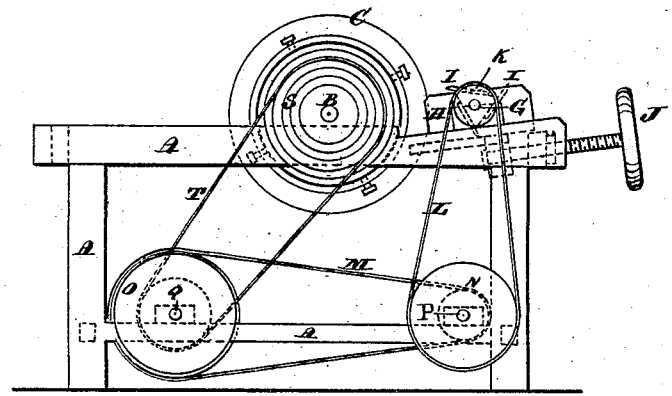
Figure 2:
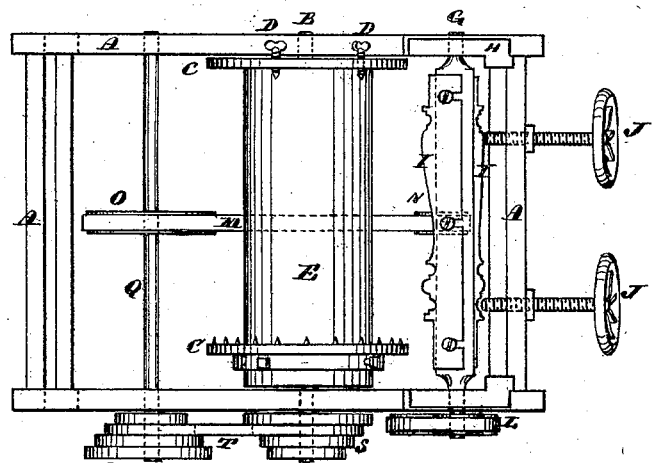
Figure 3:
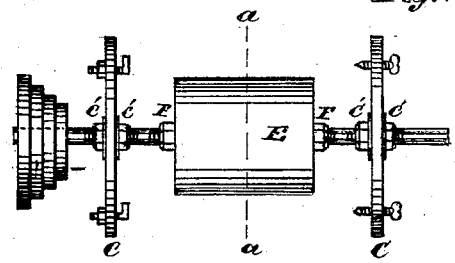
Figure 4:
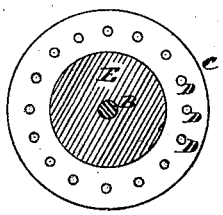

Figure 1 is a side elevation of a turning-lathe embodying my invention. Fig. 2 is a top view of the same. Fig. 3 is an elevation of the shaft and revolving flanges detached from the machine, showing an intervening removable cylinder. Fig. 4 is a section of the same on the line *a a*.

A represents the frame of the machine, of any suitable construction. B is a shaft revolving in bearings secured to the top of the frame A. C are flanges secured adjustably on the shaft B by means of nuts C' screwing thereon, or by other suitable contrivance, to allow the flanges to be set at any required distance apart to receive between them the material to be turned, and which is held fixedly by screw-clamps D, or other suitable devices near the circumference of the flanges, each piece being secured at both ends by the screw-clamps. E is a cylinder secured removably to the shaft B between the flanges by nuts F, screwing thereon, or by other suitable means, and which cylinder forms a bearing, against which the material to be turned rests, to prevent it from bending while being subjected to the action of the cutting tool or knife.

When the material to be turned is not liable to bend while being so turned, the cylinder need not be used. By revolving the shaft B, the piece or pieces of material are brought to the action of the knives or cutting-tool, so that only a portion of the piece or pieces will be cut, and which cut portion will form one of the sides of the polygon. The piece or pieces of material are then sufficiently revolved, so as to present the next required angular side to the cutting-tool, to be cut as before described.

It will thus be obvious that at each change of the material, as before mentioned, a side will be cut, and thus the lathe will turn polygonal shaped or sided balusters, newel-posts, &c., or nuts for screws, or other like metal-work.

G is a shaft operating in journal-boxes, which are secured to race-blocks H H at each end of the shaft, and which shaft is formed or built with polygonal sides, and to each side or any side is secured a knife, I, having a cutting-edge shaped to the form of the design to be turned. J J are hand-screws to move the knife-shaft G toward or from the material to be turned by the screws acting on a transverse bar connected to the race-blocks, and which blocks slide in suitable grooves or channels in the frame A. The knives and shaft are revolved by a pulley, K, on the end of the shaft, and the pulley K is driven by belts L M and pulleys N O on the shafts Q P from the main shaft Q. The shaft B is driven from the main shaft Q by the pulleys R S and belt T. The revolving knives may be dispensed with, and a fixed or movable bar substituted, on which to rest a cutting-tool in the ordinary manner of turning cylindrical bodies.

I claim as my invention—

1. The removable cylinder E, applied to the shaft B between the flanges C, substantially as shown and described.

2. The combination of the flanges C, shaft B, cylinder E, and rotary cutters I, arranged and operating as shown and described.

JOSEPH + BEAUDRY.
his mark.

Witnesses:
HENRY GRIST,
H. H. HORSEY.